Patented Apr. 15, 1952

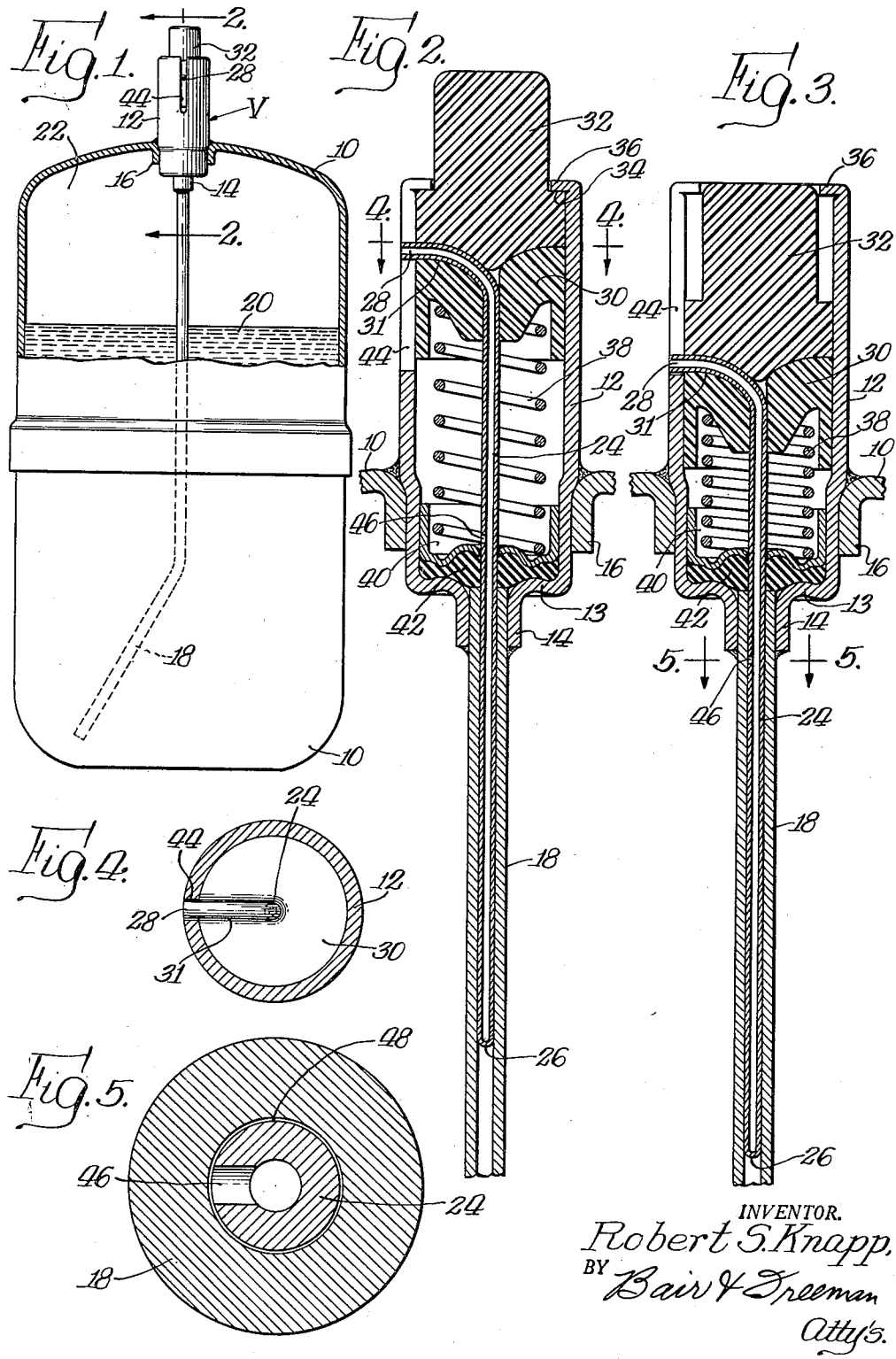

2,592,808

UNITED STATES PATENT OFFICE 2,592,808

VALVE STRUCTURE

Robert S. Knapp, St. Louis, Mo., assignor, by mesne assignments, to Knapp-Monarch Company, St. Louis, Mo., a corporation of Delaware Application April 22, 1946, Serial No. 664,083

2 Claims. (Cl. 251—78)

This invention relates to a valve structure particularly adapted for use on an aerosol bomb or the like although it can be used in many other types of installations.

One object of the invention is to provide a valve which eliminates the necessity of providing an accurately fitted valve plug and seat combination as in the usual type of valve.

Another object is to provide a valve structure employing a minimum number of parts and one wherein a packing for a hollow valve stem serves also as a means to seal off the passageway that permits fluid flow when the opening is on one side of the packing and prevents fluid flow when it is on the other side of the packing.

Still another object is to provide a valve structure wherein pressure on the packing is reduced to a minimum as represented by the difference between the external diameter of a valve stem and the internal diameter of a syphon tube whereby the pressure on the packing is much less than one percent of the pressure per square inch in a container or the like on which the valve is mounted.

More specifically, it is an object of my invention to provide a valve structure consisting of a hollow valve stem of slightly less external diameter than the internal diameter of a fluid delivery tube in which the valve stem is slidable, the valve stem having an opening and being surrounded by packing at the outer end of the fluid delivery tube with the opening normally outside the packing whereby fluid flow is stopped, and when the valve stem is slid inwardly relative to the fluid delivery tube the opening assumes a position within the tube thereby permitting fluid flow from the tube into the stem for discharge from the valve.

With these and other objects in view, my invention consists in the construction, arrangement and combination of the various parts of my valve structure whereby the objects contemplated are attained, as hereinafter more fully set forth, pointed out in my claims and illustrated in the accompanying drawings, wherein:

Figure 1 is a side elevation partly in section of an aerosol bomb to which my valve has been applied.

Figure 2 is an enlarged sectional view on the line 2—2 of Figure 1 showing the valve in closed position.

Figure 3 is a similar sectional view showing the valve in open position.

Figure 4 is a sectional view on the line 4—4 of Figure 2 showing a slidable plug in which the upper end of the valve stem is mounted, and Figure 5 is a greatly enlarged sectional view on the line 5—5 of Figure 3 to show relative external and internal diameters of a valve stem and fluid delivery tube respectively.

On the accompanying drawings, I have used the reference numeral 10 to indicate a container and the reference character V a valve mounted thereon. The valve V comprises a tubular valve casing 12 having a restricted neck 14 on its lower end. The casing 12 is soldered or otherwise suitably secured in a neck 16 of the container 10.

Soldered in the neck 14 of the casing 12 is a fluid delivery tube 18 which in the case of an aerosol bomb or the like may constitute a syphon tube for the insecticide liquid 20 in the bomb. The space 22 above the bomb is charged with air or gas under pressure of approximately 150 pounds per square inch for the purpose of displacing the fluid 20 through the syphon tube 18 and the valve V when the valve is opened.

Slidable in the fluid delivery or syphon tube 18 is a hollow valve stem 24 formed of capillary tubing, having its lower end closed as at 26 and its upper end curved to form a fluid discharge nozzle 28. The valve stem 24 is guided at its upper end by being inserted into a sliding plug 30 with its curved nozzle portion 28 lying in a radial groove 31 of the plug 30. The plug 30 may be formed of plastic or the like and above it a push button 32 (also of plastic) is mounted.

The button 32 has a shoulder 34 adapted to engage an inturned stop flange 36 of the casing 12 and such engagement is effected by a coil spring 38 between the plug 30 and a packing follower 40. Between the packing follower 40 and a lower wall 13 of the valve casing 12 is a packing washer 42, the parts 13 and 40 being so shaped as to tend to compress the packing 42 around the stem 24. The packing follower 40 is a press fit or is swedged into the valve casing 12 to cause high compression of the packing 42 around the valve stem 24.

The nozzle 28 projects from the side of the plug 30 a slight distance as shown in Figure 2 and is located in a vertical slot 44 of the casing 12. It is adapted to travel in this slot as to the position of Figure 3 when the button 32 is depressed. The valve stem 24 is provided with an inlet opening 46 normally located above the packing 42 as in Figure 2. The opening 46 may pass through the packing when the button 32 is depressed as in Figure 3.

The external diameter of the valve stem 24 is but slightly smaller than the internal diameter of the fluid delivery or syphon tube 18 as shown in Figure 5. In a valve of the size shown in Figure 1, for instance, the outer diameter of the capillary tube 24 may be approximately .028" and the internal diameter of the tube 18 about .006" to .008" larger. This will give a space all around the capillary tube that is .003" to .004" wide. This results in a maximum area in the space between the two tubes of approximately .0008 sq. in. which is only two twenty-fifths of one per cent of one square inch and this is the area that the pressure in the tube 18 exerts against the packing 42. This area being very small will produce only approximately .12 pounds per square inch pressure on the packing when the container 10 is charged with gas at 150 pounds per square inch. The pressure on the packing is accordingly substantially negligible.

In the operation of my valve, it is opened merely by pressing the button 32 so that the opening 46 is transferred from the position of Figure 2 to the position of Figure 3 whereupon the liquid 20 displaced by the gas in the space 22 of the container 10 flows upwardly in the tube 18 and then between the inner wall of this tube and the outer wall of the capillary tube 24, the space here being indicated at 48 in Figure 5. The fluid then flows through the opening 46 into the interior of the tube 24 and upwardly through it to discharge from its nozzle portion 28.

The nozzle portion is always protected by the sides of the slot 44 whether in the upper position of Figure 2 or in the lower position of Figure 3. The confined space at 48 is precalculated so as to determine the maximum flow of fluid from the nozzle 28, and is preferably small so as to permit only slow but atomized discharge of the fluid 20 from the nozzle. The tube 24 being of capillary size effects a relatively high velocity of the fluid from the opening 46 to the nozzle 28 for breaking up and atomizing the liquid as it issues from the nozzle. The liquid is thereby in the form of particles suspended in the atmosphere or in the form of a vapor so that the active ingredient of the insecticide may penetrate to all portions of a room or similar enclosure for disinfecting purposes.

Some changes may be made in the construction and arrangement of the parts of my valve structure without departing from the real spirit and purpose of my invention, and it is my intention to cover by my claims any modified forms of structure or use of mechanical equivalents which may be reasonably included within their scope.

I claim as my invention:

1. In a valve structure, a valve casing having a reduced inner terminal end and an inturned outer terminal end, a fluid delivery tube received in said first end, a capillary tube slidable in said first tube, a floating plug for guiding the outer end of said capillary tube in said valve casing, said capillary tube having said outer end bent below said second end of said valve casing to project sidewise through a slot in said valve casing, a push button above said plug and said bent end of said tube, said push button being confined by said inturned outer terminal end, packing within said valve casing adjacent the outer end of said fluid delivery tube, a packing follower against said packing, a spring interposed between said floating plug and said follower to bias said capillary tube to an outer position and said packing follower against said packing, said capillary tube having an opening within said valve casing beyond said packing, said capillary tube being adapted to be slid inwardly with respect to said fluid delivery tube with said opening passing through said packing to a position within said fluid delivery tube, said spring returning said floating plug, said push button and said capillary tube to their normal position upon release of said push button.

2. A valve structure of the character disclosed comprising a tubular valve body, a fluid delivery tube connected with the inner end thereof, a plug slidable in said body, a capillary tube connected with said plug and having an elongated portion slidable in and substantially filling said fluid delivery tube, packing surrounding said capillary tube and adjacent the outer end of said fluid delivery tube, said valve body having a slot in the side thereof, said capillary tube having a discharge end slidable in said slot, and spring means in said valve body below said plug to normally pull said capillary tube outwardly relative to said fluid delivery tube, said capillary tube having an opening, which in said position is outwardly with relation to said packing and is adapted to move through the packing and to a position within said fluid delivery tube upon depression of said plug against the action of said spring.

ROBERT S. KNAPP.

REFERENCES CITED

The following references are of record in the file of this patent:

UNITED STATES PATENTS

| Number | Name | Date |
|---|---|---|
| 25,853 | Stickney | Oct. 18, 1859 |
| 1,586,418 | Frederiksen | May 25, 1926 |
| 1,923,919 | DeMooy | Aug. 22, 1933 |
| 2,328,863 | Threm | Sept. 7, 1943 |

FOREIGN PATENTS

| Number | Country | Date |
|---|---|---|
| 240,444 | Great Britain | Sept. 17, 1925 |
| 303,041 | Great Britain | of 1928 |